(12) United States Patent
Nguyen

(10) Patent No.: US 7,180,442 B1
(45) Date of Patent: Feb. 20, 2007

(54) TARGET INDENTIFICATION METHOD USING CEPSTRAL COEFFICIENTS

(75) Inventor: Thach N. Nguyen, Waldorf, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 11/434,573

(22) Filed: May 3, 2006

(51) Int. Cl.
G01S 13/04 (2006.01)
G01S 15/04 (2006.01)
G01S 13/00 (2006.01)
G01S 15/00 (2006.01)

(52) U.S. Cl. ............... 342/90; 342/27; 342/28; 342/89; 342/175; 342/192; 342/195; 342/196; 382/103; 367/87; 367/93; 367/94; 324/76.12; 324/76.19; 324/76.21

(58) Field of Classification Search ........... 342/27, 342/28, 82–103, 175, 189–197; 367/87–105, 367/43, 47; 324/76.12–76.38; 704/201, 704/226, 228; 382/103; 73/602
See application file for complete search history.

(56) References Cited

U.S. PATENT DOCUMENTS

| | | | | |
|---|---|---|---|---|
| 3,471,781 A | * | 10/1969 | Shapiro et al. | 327/76.24 |
| 3,662,108 A | * | 5/1972 | Flanagan | 704/228 |
| 4,545,250 A | * | 10/1985 | Miwa | 73/602 |
| 4,780,859 A | * | 10/1988 | Hadidi et al. | 367/43 |
| 4,864,307 A | * | 9/1989 | Potage et al. | 342/192 |
| 6,333,986 B1 | * | 12/2001 | Petty | 382/103 |
| 6,573,861 B1 | * | 6/2003 | Hommel et al. | 342/192 |

FOREIGN PATENT DOCUMENTS

| | | | |
|---|---|---|---|
| EP | 0955557 A2 | * | 11/1999 |
| GB | 2104218 A | * | 3/1983 |

OTHER PUBLICATIONS

D.G. Childers et al, "The Cepstrum: A Guide to Processing"; Proceedings of the IEEE; vol. 65, No. 10; Oct. 1977; pp. 1428-1443.*
L.R. Rabiner, "A Tutorial on Hidden Markov Models and Selected Applications in Speech Recognition"; Proceedings of the IEEE, vol. 77, No. 2; Feb. 1989; pp. 257-286.*
M.R. Bell et al., "JEM Modeling and Measurement for Radar Target Identification"; IEEE Transactions on Aerospace and Electronic Systems; vol. 29, No. 1; Jan. 1993; pp. 73-87.*

* cited by examiner

Primary Examiner—Bernarr E. Gregory
(74) Attorney, Agent, or Firm—Mark O. Glut

(57) ABSTRACT

A method of identifying an unknown target comprising creating a density function of cepstral coefficients for a known target; receiving a signal from the unknown target; transforming the signal from a time spectrum to a frequency spectrum using a Fourier transform; transforming the frequency spectrum to a cepstrum; creating a density function of cepstral coefficients for the unknown target; and comparing the density function of the unknown target with the density function of the known target.

17 Claims, 2 Drawing Sheets

TARGET IDENTIFICATION METHOD USING CEPSTRAL COEFFICIENTS

STATEMENT OF GOVERNMENT INTEREST

The inventions described herein may be manufactured, used and licensed by or for the U.S. Government for U.S. Government purposes.

REFERENCE TO COMPUTER PROGRAM LISTING APPENDIX

A computer program listing is hereby expressly incorporated by reference. The appendix includes two duplicate compact discs. The files on each compact disc, their size in bytes, and the date created are as follows:

| File Name | Size | Date Created |
| --- | --- | --- |
| CEP | 1 KB | Apr. 6, 2006 |
| COLLECT | 2 KB | Apr. 6, 2006 |
| CREATE | 3 KB | Apr. 6, 2006 |
| ENDPOINT | 1 KB | Apr. 6, 2006 |
| EVALB | 1 KB | Apr. 6, 2006 |
| FEATURES | 2 KB | Apr. 6, 2006 |
| INIMOD | 1 KB | Apr. 6, 2006 |
| READ | 1 KB | Apr. 6, 2006 |
| REEST | 2 KB | Apr. 6, 2006 |
| RUN | 1 KB | Apr. 6, 2006 |
| TEST | 1 KB | Apr. 6, 2006 |
| TESTINGMODEL | 5 KB | Apr. 6, 2006 |
| TRAIN_HMM | 1 KB | Apr. 6, 2006 |
| VITERBI | 1 KB | Apr. 6, 2006 |

BACKGROUND OF THE INVENTION

The invention relates in general to digital signal processing methods for identifying unknown targets and in particular to the use of cepstral coefficients in the identification method.

Digital signal processing is used in a wide variety of applications directed to identifying unknown targets. While the precise identity of the unknown target is not known, one assumes that the unknown target is one of a group of known targets. Therefore, digital templates or signatures of known targets are created first. Then, a signal from an unknown target is received and processed. The signature of the unknown target is compared with the signatures of the known targets. The unknown target is identified as the known target having the signature that best matches the signature of the unknown target. The unknown target may be passive or active. The signal may be electromagnetic or acoustic. If the unknown target is passive, it is radiated with a signal and the reflected signal is processed.

This general method has been used in, for example, voice recognition and military target recognition applications. In the military environment, a particular area of interest is Non-Cooperative Target Identification (NCTI). NCTI systems are a valuable piece of the combat identification puzzle. NCTI exploits the physical attributes of targets of interest by using the principles of physics, without intentional participation of the target. Known systems are signals returning from the Radar Signal Modulation (RSM) phenomenon to process and extract signatures that support recognition of types of targets.

In some cases, however, the unknown target signal cannot be matched with a known target signal. Ambiguity may exist due to the similarity of physical attributes between some targets of interest. Some targets differ only in two major areas: their low order features, which are not easily discernable using existing NCTI technology due to low signal to noise ratio (SNR); and/or their frequencies, which are a function of time (varying with time). Thus, there is a need for an improved method of identifying targets.

SUMMARY OF THE INVENTION

It is an object of the invention to provide a method of identifying an unknown target using electromagnetic radiation or acoustic radiation.

It is another object of the invention to provide a method of identifying an unknown target wherein the unknown target may be active or passive.

It is a further object of the invention to provide a method of identifying an unknown target that improves on the known radar signal modulation method.

It is still another object of the invention to provide a method of identifying an unknown target that utilizes cepstrum analysis.

One aspect of the invention is a method of identifying an unknown target, comprising creating a density function of cepstral coefficients for a known target; receiving a signal from the unknown target; transforming the signal from a time spectrum to a frequency spectrum using a Fourier transform; transforming the frequency spectrum to a cepstrum; creating a density function of cepstral coefficients for the unknown target; and comparing the density function of the unknown target with the density function of the known target.

The received signal may be digital or analog. If analog, the signal is digitized. The received signal may comprise electromagnetic and/or acoustic radiation. The unknown target may be active or passive. If passive, then the unknown target is radiated with a signal and the reflected signal is received.

The step of creating a density function of cepstral coefficients for a known target comprises receiving a signal from the known target; transforming the signal from a time spectrum to a frequency spectrum using a Fourier transform; and transforming the frequency spectrum to a cepstrum.

In one embodiment, the step of creating a density function of cepstral coefficients for a known target comprises creating a Hidden Markov Model and the step of creating a density function of the cepstral coefficients for the unknown target comprises creating a Hidden Markov Model.

The method further comprises, after the comparing step, the step of identifying the unknown target as the known target if the density function of the unknown target is sufficiently similar to the density function of the known target.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not to scale, like or corresponding parts are denoted by like or corresponding reference numerals.

DETAILED DESCRIPTION OF THE PREFERRED EMBODIMENTS

The invention uses digital signal processing to identify unknown targets. In general, the unknown target is not "entirely" unknown because it is assumed to be a member of a group of one or more known targets. Thus, identifying the unknown target comprises choosing its identity from one of the known identities in the group. A "target" may be an animate or an inanimate object. In the case of speech recognition, the target is a human. The target may also be a nonhuman animal that creates acoustic radiation, such as a bird that sings or a dog that barks. The target may be an inanimate object that creates acoustic radiation, such as any mechanized vehicle with engine or other noise.

The target need not actively emit any measurable radiation, either electromagnetic or acoustic. In the passive target case, electromagnetic or acoustic radiation is directed to the target and reflected from the target to a receiver. The apparatus used to implement the invention may comprise known transmitters, receivers and computers. The known apparatus is modified by using computer software that implements the inventive method.

Figure 1:
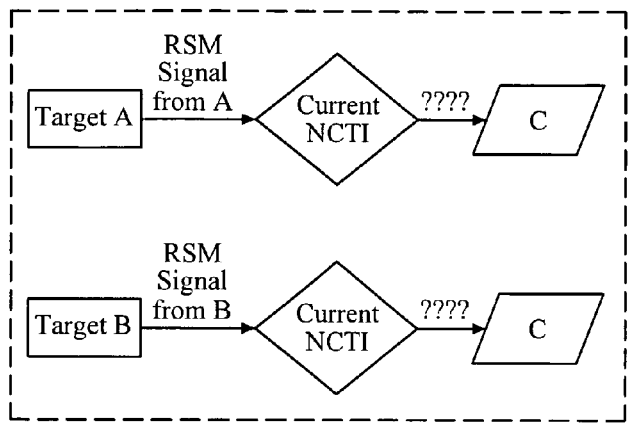
FIG. 1 is a flow chart showing an ambiguous output.
Figure 2:
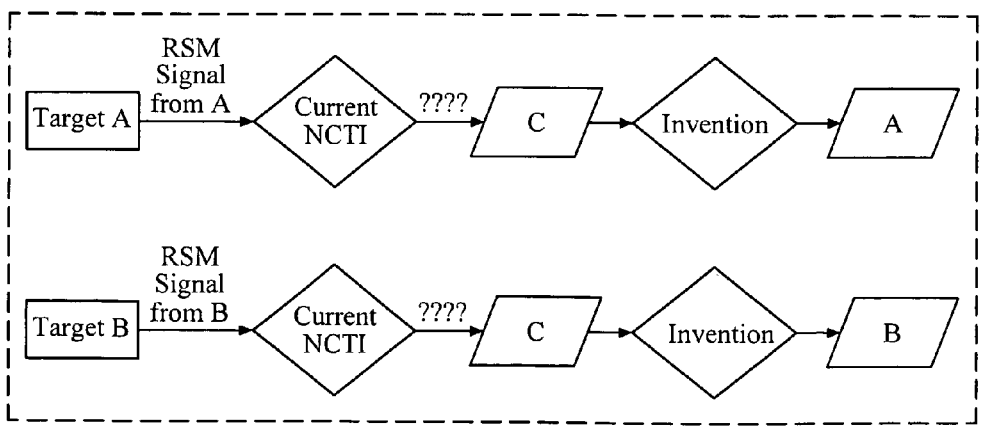
FIG. 2 is a flow chart showing one use of the invention.

Radar is a familiar example of reflected electromagnetic radiation used for identification purposes. As discussed above, the invention may be used to solve ambiguity problems with an existing Radar Signal Modulation-based Non-Cooperative Target Identification (NCTI) system. For example, suppose the respective signals of two targets A and B have their signature differing only in their low order features. Given that an NCTI system receives RSM signals from A or B, the system may not be able to distinguish between the two targets A and B. So, the system outputs C to describe that the target is either A or B. (See FIG. 1). The present invention may be used to continue where the known NCTI system leaves off. After the known NCTI system provides only an ambiguous C decision response, this output becomes the input signal C (composed either of A or B) to the inventive technique. The invention is able to separate the A or B signals from the ambiguous decision input C. (See FIG. 2)

Figure 3A:
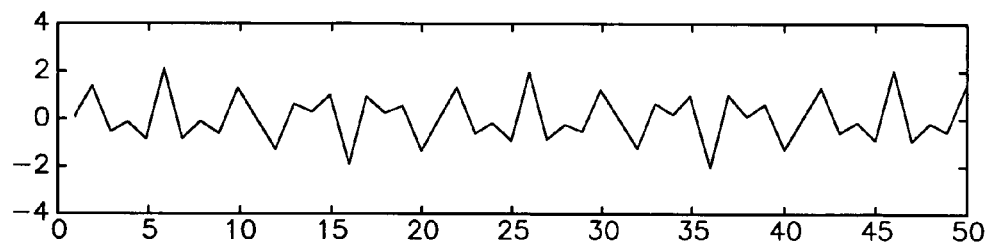
FIGS. 3A–C show a signal in the time, frequency and cepstrum domains, respectively.
Figure 3B:
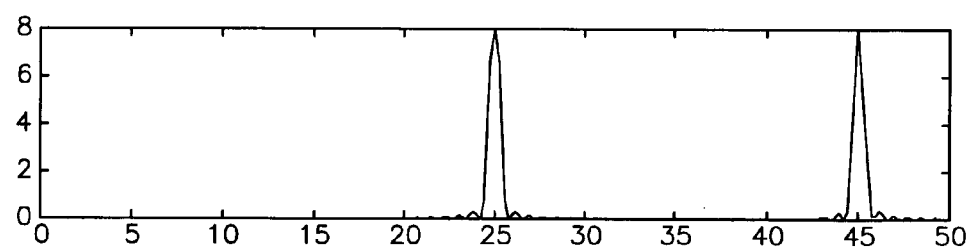
Figure 3C:
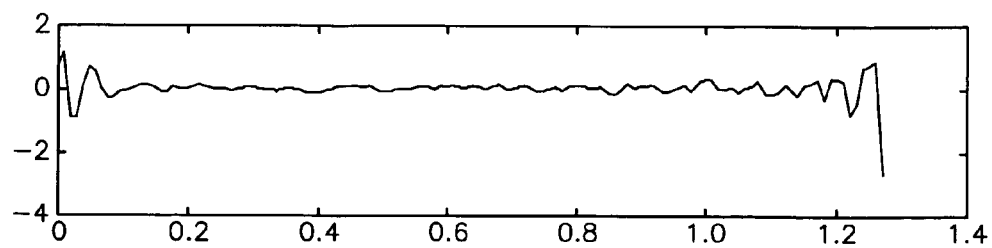

FIGS. 3A–C show an exemplary analog signal in the time, frequency and cepstrum domains, respectively. The vertical axes are amplitude. In FIG. 3A the horizontal axis is time, in FIG. 3B it is frequency and in FIG. 3C it is the "period," which is the inverse of the frequency and has units of time. The cepstrum domain gives information about an unknown target signal that is not obvious in the frequency domain. This is because signatures of the targets of interest may have very low signal to noise ratio (SNR) and are not seen in the frequency domain. Additionally, the frequency profile of the targets is a function of time, which is to say that it varies significantly with time.

The invention extracts the signal of interest in the cepstrum domain. One may think of the cepstrum domain as the frequency of a frequency. Each sample vector is represented by an n-dimensional vector of low-order cepstral components (or coefficients). For a given signal vector Y, cepstral coefficients are defined as:

$$Y = (y_1, y_2, y_3, \ldots, y_N)$$

The discrete Fourier transform of Y is:

$$Y_m = \sum_{n=1}^{N} Y_n \exp\left(-j\frac{2\pi}{M}mn\right)$$

Where $M \leq 2N$ and $m=1, 2, 3, \ldots, M$

The cepstral components are obtained from $$C_y(n) = \frac{1}{M}\sum_{m=1}^{M} \log\left(\frac{1}{N}|Y_m|^2\right) \exp\left(j\frac{2\pi}{M}mn\right)$$

Where $n=1, 2, 3, \ldots, M$

The time domain signal is transformed to the frequency domain and the frequency domain signal is then transformed to the cepstrum domain. The cepstrum transform capitalizes on the physical phenomenon of harmonics of a frequency to pull critical target identification data from low Signal to Noise Ratio situations. Likewise, the coefficients of the ensuing discrete frequency values allows a cross correlation between a priori data of possible targets.

As discussed above, the unknown target is a member of a group of one or more known targets. Therefore, the first step is to create templates or signatures for the known targets. A known target signal (active or reflected) is received. If the signal is an analog signal, the analog signal is digitized. The digital signal is transformed from the time domain to the frequency domain using a Fourier transform. The frequency domain is then transformed to the cepstrum domain using a cepstrum transform. The cepstral coefficients are extracted from the cepstrum domain. Then, a density function of the chosen cepstral coefficients is created. The density function of the cepstral coefficients of the known target is the template or signature that is compared to the density function of the cepstral coefficients of an unknown target. After all the applicable templates are created, the unknown target signal "y" is compared against the known templates. The minimum probability of recognition error is achieved by choosing the template target x, which makes the given signal, y, most probable:

$$\arg\max_{x} \; p(y/x)$$

The cepstral coefficients may be chosen by a variety of methods. Preferably, the cepstral coefficients are chosen from a group beginning with a smallest period (or a window side) and then a next smallest period and so on. For example, in FIG. 3C, the cepstral coefficients would be chosen starting with the smallest period (i.e., just to the right of 0 on the horizontal axis) and then the next smallest period, etc. The cepstral coefficient for any period is the amplitude of the cepstrum at that period. Any number of cepstral coefficients may be chosen to create the density function. In one embodiment, the number of cepstral coefficients is in the range from 2 to about 100, preferably from 2 to about 50, more preferably from 2 to about 30 and most preferably about 25.

The density functions created with the cepstral coefficients may be a Gaussian, a Non-Gaussian, or a Hidden Markov Model (HMM). In one embodiment of the invention, the density functions are HMMs. The signal of interest may be characterized as a parametric random process, and the parameters of the stochastic process can be determined in a precise, well-defined manner using the Markovian principal. Training comprises an estimation of Initial state, State transition, and Mean and Covariance matrices.

Below are three basic steps that must be solved for the HMM to be useful in the invention:

1) Given the observation sequence $O=\{o1,o2,o3,o4,\ldots\}$ and the model $\lambda=(A,B,\pi)$, Where:

A=State transition probabilities.
B=Observation symbol probabilities in states.
$\pi$=Initial state probabilities.

Compute $P(O|\lambda)$, the probability of the observation sequence, given the model.

2) Given the observation sequence $O=\{o1,o2,o3,o4,\ldots\}$ and the model $\lambda$, choose a corresponding state sequence $q=(q1q2q3\ldots qT)$ that is optimal in some sense (i.e., best "explains" the observation).

3) And lastly, adjust the model parameters $\lambda=(A,B,\pi)$, to maximize $P(O|\lambda)$. An expectation algorithm may be used to perform maximum likelihood estimation of these parameters. Detailed information concerning HMM is found in "A Tutorial on Hidden Markov Models and Selected Applications in Speech Recognition," by L. R. Rabiner, Proceedings of the IEEE, Vol. 77, No. 2, February 1989, pp. 257–286, which is hereby incorporated by reference.

The invention uses a density function-based template that reduces the ambiguity between similar targets. It accomplishes this by both enunciating the signals that would have otherwise been lost due to low SNR conditions, and addressing the time variations in the frequency profiles of the target. This template allows more detailed and confident comparison when the actual target characteristics are compared against the template.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method of identifying an unknown target, comprising:
    creating density functions of cepstral coefficients for known targets;
    receiving a signal from the unknown target;
    transforming the signal from a time spectrum to a frequency spectrum using a Fourier transform;
    transforming the frequency spectrum to a cepstrum;
    creating a density function of cepstral coefficients for the unknown target; and
    comparing the density function of the unknown target with density functions of the known targets, when the density of the unknown target is similar to the density of one of the known targets, identifying the unidentified target as of the same type as the known target of similar density.

2. The method of claim 1 wherein the step of receiving a signal comprises receiving an analog signal and digitizing the analog signal.

3. The method of claim 1 wherein the step of receiving a signal comprises receiving a signal comprising electromagnetic radiation.

4. The method of claim 1 wherein the step of receiving a signal comprises receiving a signal comprising acoustic radiation.

5. The method of claim 1 wherein the step of creating a density function of cepstral coefficients for a known target comprises creating a Hidden Markov Model and the step of creating a density function of the cepstral coefficients for the unknown target comprises creating a Hidden Markov Model.

6. The method of claim 1 further comprising, before the step of receiving a signal, the step of radiating the unknown target with a signal, and the step of receiving a signal comprises receiving a signal reflected from the unknown target.

7. The method of claim 6 wherein the step of radiating the unknown target comprises radiating the unknown target with electromagnetic radiation.

8. The method of claim 6 wherein the step of radiating the unknown target comprises radiating the unknown target with acoustic radiation.

9. The method of claim 1 wherein the step of creating a density function of cepstral coefficients for a known target comprises receiving a signal from the known target; transforming the signal from a time spectrum to a frequency spectrum using a Fourier transform; and transforming the frequency spectrum to a cepstrum.

10. The method of claim 1 wherein the step of creating a density function of cepstral coefficients for a known target includes the step of creating density functions of cepstral coefficients for a plurality of known targets and the step of comparing comprises comparing the density function of the unknown target with the density functions of the plurality of known targets.

11. The method of claim 10 further comprising after the comparing step, the step of identifying the unknown target as one of the plurality of known targets having a density function most similar to the density function of the unknown target.

12. The method of claim 11 further comprising, before the step of receiving a signal, the step of radiating the unknown target with a radar signal and wherein the step of receiving a signal comprises receiving a radar signal reflected from the unknown target.

13. The method of claim 1 further comprising, after the comparing step, the step of identifying the unknown target as the known target if the density function of the unknown target is sufficiently similar to the density function of the known target.

14. The method of claim 1 wherein the step of creating a density function of cepstral coefficients for a known target comprises choosing cepstral coefficients from a group beginning with a smallest period and then a next smallest period and so on and the step of creating a density function of the cepstral coefficients for the unknown target comprises choosing cepstral coefficients from a group beginning with a smallest period and then a next smallest period and so on.

15. The method of claim 14 wherein a number of cepstral coefficients chosen for the known target and a number of cepstral coefficients chosen for the unknown target is from two to about one hundred.

16. The method of claim 15 wherein the number of cepstral coefficients chosen for the known target and the number of cepstral coefficients chosen for the unknown target is from two to about fifty.

17. The method of claim 16 wherein the number of cepstral coefficients chosen for the known target and the number of cepstral coefficients chosen for the unknown target is from two to about thirty.

* * * * *